United States Patent
Shultis

(10) Patent No.: US 7,555,979 B2
(45) Date of Patent: Jul. 7, 2009

(54) APPARATUS FOR PRODUCING A BEVERAGE

(76) Inventor: Emil Shultis, P.O. Box 573, Leed, NY (US) 13451

( * ) Notice: Subject to any disclaimer, the term of this patent is extended or adjusted under 35 U.S.C. 154(b) by 512 days.

(21) Appl. No.: 11/145,720

(22) Filed: Jun. 6, 2005

(65) Prior Publication Data

US 2006/0169148 A1    Aug. 3, 2006

Related U.S. Application Data

(60) Provisional application No. 60/648,106, filed on Jan. 28, 2005.

(51) Int. Cl.
 *A47J 31/00* (2006.01)
(52) U.S. Cl. .......................... 99/275; 99/289 R; 99/304; 99/305; 99/323.3; 222/146.2
(58) Field of Classification Search .................. 99/275, 99/280, 281, 282, 283, 289 R, 295, 299, 300, 99/304, 306, 305; 222/146.2, 146.1, 145.1, 222/129.1, 105
See application file for complete search history.

(56) References Cited

U.S. PATENT DOCUMENTS

| | | | |
|---|---|---|---|
| 2,950,973 A | 8/1960 | Cameron | 99/71 |
| 3,001,557 A | 9/1961 | Kuckens | 141/94 |
| 3,105,616 A | 10/1963 | Krup | 222/129.2 |
| 3,119,695 A | 1/1964 | Kahan | 99/79 |
| 3,532,505 A | 10/1970 | Cornelius | 99/71 |
| 3,536,496 A | 10/1970 | Paoloni | 99/71 |
| 3,628,345 A | 12/1971 | King | 62/123 |

(Continued)

FOREIGN PATENT DOCUMENTS

DE    4108586    9/1992

(Continued)

OTHER PUBLICATIONS

Yehuda Einav, pending U.S. Appl. No. 29/242,639, filed Nov. 10, 2005, entitled "Dispenser for Liquids".

(Continued)

*Primary Examiner*—Reginald L Alexander
(74) *Attorney, Agent, or Firm*—Heslin Rothenberg Farley & Mesiti P.C.

(57) ABSTRACT

An apparatus is provided for producing a beverage from concentrate. A mixing chamber is included. A water tank and a concentrate container provide water and concentrate. A water conduit is horizontally oriented and is connected to the water tank to supply water from the water tank to the mixing chamber by gravity. A concentrate conduit extends from the concentrate container and at an acute angle to the water conduit and then extends generally parallel to the water conduit and in close proximity to the water conduit. The mixing chamber is connected to both the water conduit and the concentrate conduit. Both the concentrate conduit and the water conduit have an outlet end. Each outlet end is remote from the water tank and the concentrate container. The outlet end of the concentrate conduit is adjacent to the outlet end of the water conduit. A dispenser assembly is mounted on the mixing chamber. A strength valve is located in the concentrate conduit adjacent to the mixing chamber to control the flow of concentrate. An electrical circuit is provided including a means for adjusting the temperature of the water.

12 Claims, 5 Drawing Sheets

U.S. PATENT DOCUMENTS

| | | | |
|---|---|---|---|
| 3,641,918 A | 2/1972 | Schellgell et al. | 99/279 |
| 3,790,029 A | 2/1974 | Ward | 222/129.4 |
| 3,843,020 A | 10/1974 | Bardeau et al. | 222/58 |
| 4,300,442 A | 11/1981 | Martin | 99/289 |
| 4,309,939 A | 1/1982 | Stover | 99/280 |
| 4,470,999 A * | 9/1984 | Carpiac | 426/506 |
| 4,579,048 A | 4/1986 | Stover | 99/280 |
| 4,624,395 A | 11/1986 | Baron | 222/129.1 |
| 4,809,594 A * | 3/1989 | Vitous | 99/280 |
| 4,830,869 A | 5/1989 | Wimmers et al. | 426/595 |
| 5,011,700 A | 4/1991 | Gustafson et al. | 426/477 |
| 5,068,116 A * | 11/1991 | Gibney et al. | 426/231 |
| 5,240,722 A | 8/1993 | Louridas | 426/77 |
| 5,740,719 A | 4/1998 | Triola et al. | 99/302 |
| 5,975,365 A * | 11/1999 | Hsieh | 222/129.4 |
| 6,073,539 A | 6/2000 | Triola | 99/290 |
| 6,149,035 A | 11/2000 | Gorski et al. | 222/129.4 |
| 6,752,069 B1 | 6/2004 | Burke et al. | 99/280 |
| 6,808,731 B1 | 10/2004 | Gutwein et al. | 426/433 |
| 7,028,603 B1 | 4/2006 | Gremillion et al. | 99/290 |
| D557,057 S | 12/2007 | Einav | D7/307 |

FOREIGN PATENT DOCUMENTS

| | | |
|---|---|---|
| EP | 1095898 | 5/2001 |
| WO | WO 2006/083473 A3 | 8/2006 |

OTHER PUBLICATIONS

Shultis, PCT International Patent Application No. PCT/US2008/060460, filed Apr. 16, 2008, 21 pages.

Shultis, U.S. Appl. No. 11/814,966 entitled Apparatus and Method for Producing a Beverage, filed Jul. 27, 2007.

* cited by examiner

APPARATUS FOR PRODUCING A BEVERAGE

CROSS REFERENCE TO A RELATED APPLICATION

This patent application claims the benefit of an earlier filing date under 35 USC 119(e) of a Provisional Patent Application, filed in the United States Patent and Trademark Office on Jan. 28, 2005 and entitled Device for making Coffee from Concentrate and being Provisional Application 60/648,106.

BACKGROUND OF THE INVENTION

1. Field of the Invention

The present invention relates to an apparatus for producing a beverage and, more specifically, to a apparatus for producing a beverage from a liquid concentrate.

2. Description of the Prior Art

Many beverages have been produced from concentrate including fruit juices and coffee and tea. However, the production of coffee and tea from concentrate has been limited substantially to commercial apparatus that is too expensive and cumbersome for home or office usage. An example of a beverage apparatus that produces beverages from two liquid concentrates is shown in the U.S. patent to Bardeau. U.S. Pat. No. 3,843,020.

Another example found in the U.S. Patent art, is the Burke et al Patent, U.S. Pat. No. 6,752,069. Burke et al adds water, either manually of automatically, to a beverage concentrate. The device, which may perform well, is large and complex and thus, at least as to the area of home appliances, is too expensive.

The Shaver patent, U.S. Pat. No. 4,579,048 initially brews a concentrate, specifically from tea leaves, to produce a concentrate. The concentrate is then diluted to an acceptable strength and temperature by the timed addition of water. Once again, what apparently is a desirable device for commercial use is economically not practical for home usage and is also far too large for home usage.

The Gorski dt al Patent, U.S. Pat. No. 6,149,035 uses a dry concentrate for dispensing a food or beverage. Once again an apparatus is taught which is economically unsuitable for home or office usage.

Today, liquid concentrate is economically produced and supplies of liquid coffee concentrate as well as other concentrates are available. Unfortunately, a practical apparatus for home or office use does not exist to produce coffee and tea from concentrates. Liquid concentrates provide a superior beverage and a much neater operation for the production of a beverage. When brewing coffee from liquid coffee concentrate there are no filters of used coffee grounds to clean up.

The use of a concentrate to produce coffee in a home or office from a concentrate has been recognized. The Paoloni Patent, U.S. Pat. No. 3,536,496 teaches a simplified method for producing concentrate and then using such concentrate for producing coffee. The method, however, is not practical for use today and with the availability of liquid coffee concentrate, the concept is not suitable for home and office usage. What is needed is an apparatus that is of a size and cost suitable for use in the home or office and which can brew a fresh cup of coffee one cup at a time on demand.

Efforts have been made to produce a coffee maker that uses liquid concentrate for home and office use. The Triola et al Patent, U.S. Pat. No. 5,740,719 describes a coffee maker using liquid coffee concentrate that is intended for home and office usage. Triola, et al continued with the concept of requiring a pump to deliver the concentrate. This feature has been universally accepted in the prior art. To eliminate an electromechanical pump, Triola et al uses a cylinder which is pressed down by hand to deliver concentrate. Controlling the amount of concentrate when pressing on the cylinder is not a simple task and too much or too little concentrate can result only too easily. The Triola et al Patent exemplifies the previous inability to produce a simple apparatus for making coffee from liquid coffee that operates on a gravity fed system free of pumps, whether manual or power operated.

Vitality Foodservice, Inc. of Tampa, Fla. offers dispensers for coffee and hot beverages. The device includes a solenoid valve for controlling discharge of water from a water tank to an open channel. Disposed above the open channel is a control valve for controlling discharge of concentrate into the water in the channel. The resulting beverage is then discharged.

OBJECTS OF THE INVENTION

The objects of this invention are as follows:

1. To provide a low-cost apparatus to produce to produce a beverage from liquid concentrate.

2. To provide a simple, low-cost apparatus for producing a beverage from liquid concentrate which apparatus is sufficiently compact in size for home usage.

3. To provide an apparatus for producing a beverage from concentrate that operates by gravity and does not require any pumps.

4. To provide an apparatus for producing a beverage from a liquid concentrate that permits the selection of the strength of the beverage.

5. To provide an apparatus for producing a beverage from concentrate that is comparatively inexpensive so that the apparatus is economically suitable for use in the home and office.

6. To provide an apparatus for producing a beverage from concentrate that is dependable.

These and other objects of the present invention will become apparent upon further review of the following representations and drawings.

SUMMARY OF THE INVENTION

An apparatus is provided for producing a beverage from concentrate which includes both a water tank and a concentrate tank. A mixing chamber is also included. A water conduit supplies water from the water tank to the mixing chamber by gravity and a concentrate conduit supplies concentrate from the concentrate container to the mixing tank by gravity. An electric circuit includes a means for maintaining a predetermined temperature of the water in the water tank and a dispenser assembly releases water from the water conduit and concentrate from the concentrate conduit.

BRIEF DESCRIPTION OF THE NUMERALS

Numeral Description
11 Enclosure
13 Front
15 Back
17 Two Sides
19 Base
21 Lid
23 Lip
25 Water Tank
27 Vent
29 Water Inlet
31 Supply Line
33 Fill Valve
35 Side
37 Base
39 Concentrate Container
41 Flexible Bag
43 Outlet
45 Probe
47 Lower End
49 Conduit Housing
51 Concentrate Conduit
53 Top
55 Bottom
57 Two Sides
59 Two Ends
61 Inlet End
63 Outlet End
65 Upper Portion
67 Lower Portion
69 Water Conduit
71 Channels
73 Float Valve
75 Water Outlet
77 Nipple
79 Mixing Chamber
81 Upper Section
83 Lower Section
85 Nozzle
87 Cylindrical Extension
89 Conduit Opening
91 Mixing Opening
93 Strength Valve
95 Knob
97 Retaining Ring
99 Passageway
101 External Thread
103 Dispenser Assembly
105 Cap
107 Stopper
109 Actuation Rod
111 Ring
113 Coil Spring
115 Handle
117 Rocker Members
119 Cotter Pin
120 Groove and Opening
121 Power Source
123 Switch
125 Red Light
127 Float Switch
129 Relay
130 Thermal Adjusting Unit
131 Normally-Closed Thermal Button
133 Normally-Open thermal Button
135 Green Light
139 Normally-Closed Thermal Button

DETAILED DESCRIPTION OF THE PREFERRED EMBODIMENT

Figure 1:
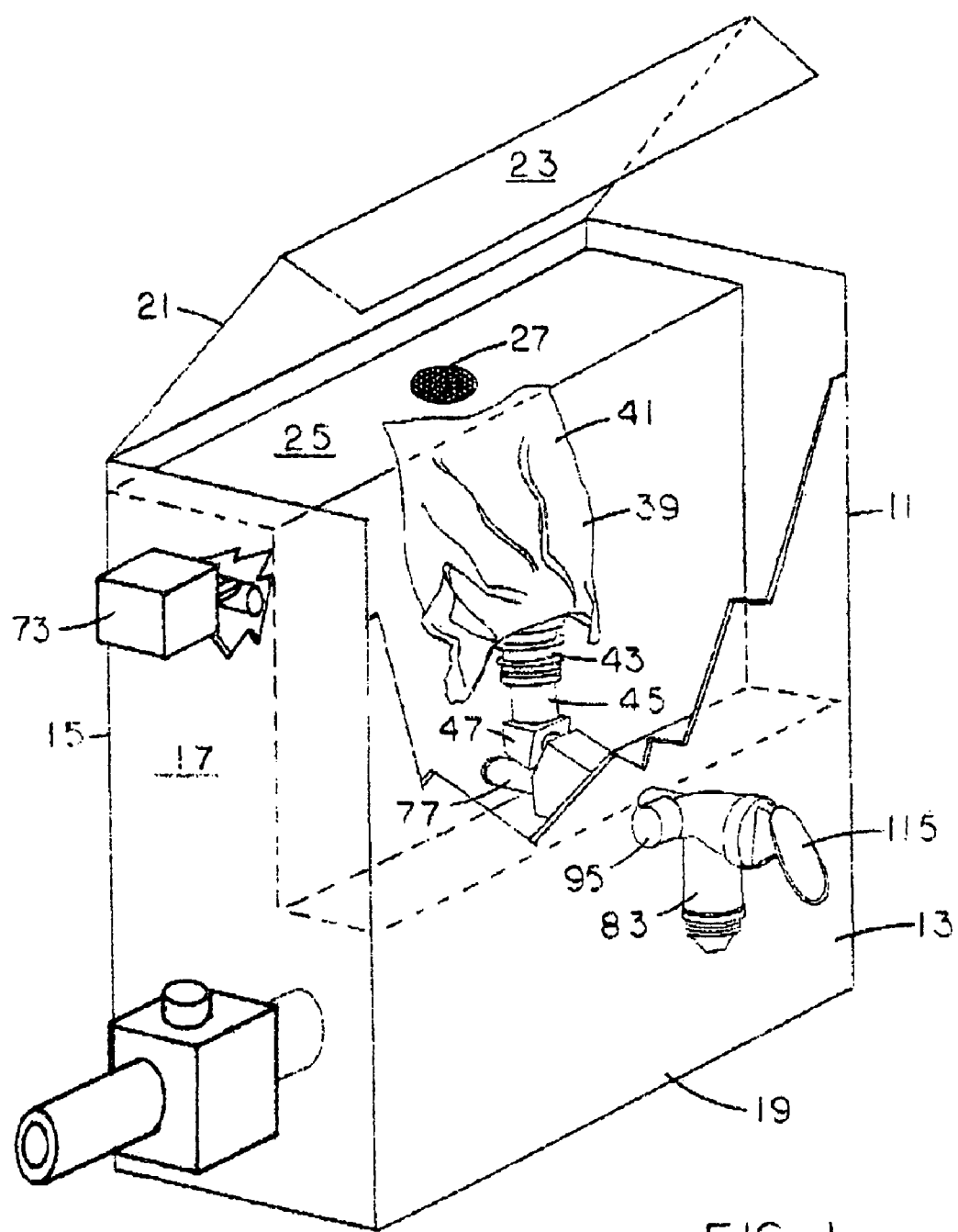
FIG. 1 is a pictorial view of the apparatus for producing a beverage with the enclosure partially broken away showing the water tank, the concentrate container, the strength valve and the dispenser.

Referring now to FIG. 1, the apparatus is shown for producing a beverage. The apparatus includes an enclosure 11 which is shown partially broken away. The enclosure 11 has a front 13 and a back 15 and two sides 17 as well as a base 19. A lid 21 is hinged to the back 15 to rotate away from the front 13 and sides 17. The lid 21 includes a lip 23 which extends at right angles from the lid 21 to fit securely against the front 13. Within the enclosure 11 against the back 15 is a water tank 25. At the top of the water tank 25 is a vent 27. A water inlet 29 extends through one side wall 17 of the enclosure 11 to supply water to the water tank 25.

Mounted in front of the water tank 25 is a concentrate container 29. The concentrate container 39, as shown, preferably includes a flexible bag 41 that collapses as concentrate is consumed. The flexible bag 41 is inexpensive and once emptied is readily disposable. In addition to the flexible bag 41, the concentrate container 39 includes an outlet 43 which is sealed until pierced by a probe 45 which self seals in the outlet 43. The concentrate container 39 is mounted on the probe 45.

Figure 2:
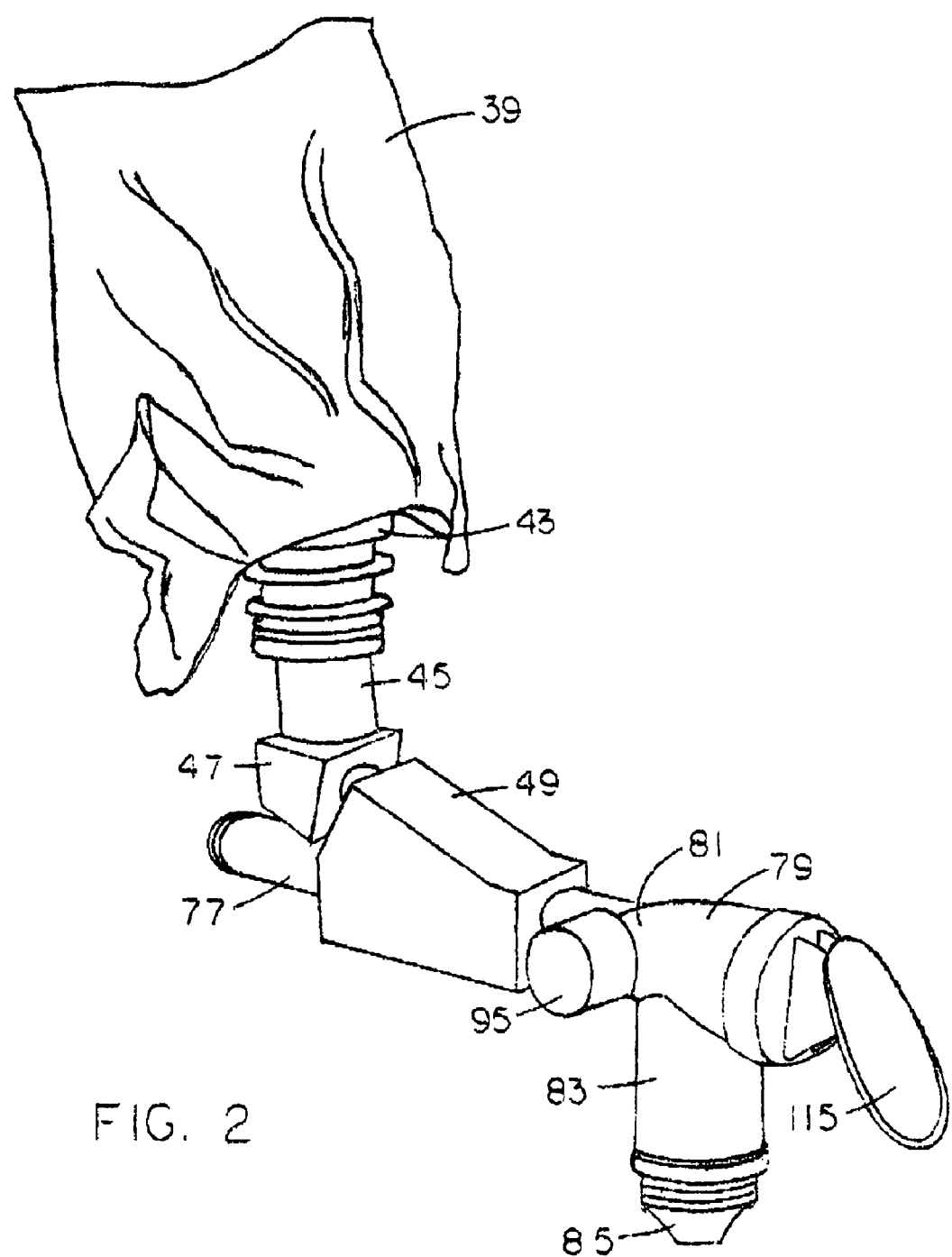
FIG. 2 is a pictorial view of the concentrate container, the connection for the water tank, the connection for the concentrate, container as well as the strength valve and the dispenser.
Figure 3:
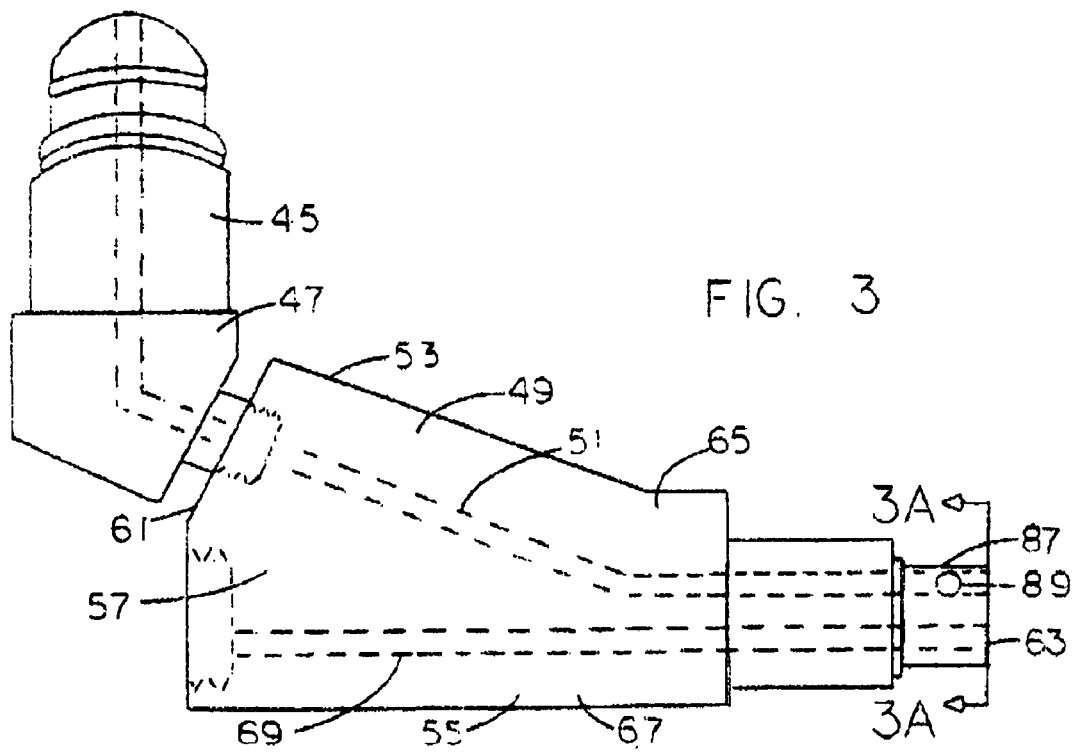
FIG. 3 is a side elevation of the water conduit and the concentrate conduit showing the flow paths in broken lines.

As seen in FIG. 2, and FIG. 3, the probe 45 connects to a conduit housing 47. The probe 45 is generally vertically oriented but at its lower end 47 is offset at an obtuse angle to the vertical to join the conduit housing 49. The probe 47 is threaded at its lower end 47 which is the end opposite from the concentrate container 39. This thread engages a thread in the conduit housing 49.

As seen in broken lines in FIG. 3, a concentrate conduit 51 extends through the conduit housing 49. The concentrate conduit 51 is located an acute angle to the horizontal within the conduit housing 49. The conduit housing 45 has a top 53 which is inclined at an acute angle to the horizontal, a bottom 55 which is generally horizontal as well as two sides 57 which are generally vertical and preferably parallel to one another. The conduit housing 49 also has two ends 59, namely an inlet end 61 adjacent to the water tank 29 and concentrate container 39 and an outlet end 63. Concentrate flows from the inlet end 61 to the outlet end 63 through the concentrate conduit 51. The concentrate conduit 51 is inclined to the horizontal at an acute angle but the concentrate conduit 51 turns to the horizontal at the outlet end 63 of the conduit housing 49. The conduit housing 49 has a upper portion 65 adjacent the top 53 of the conduit housing 49 and a lower portion 67 adjacent the bottom 55 of the conduit housing 49. The outlet end 61 of the upper portion 65 of the conduit housing 49 is sloped at an acute angle to the horizontal to accommodate the obtuse angle to the vertical at the lower end 47 of the probe 45. The lower portion 67 of the inlet end 61 is generally at right angles to the bottom 55 of the conduit housing 49.

Figure 3A:
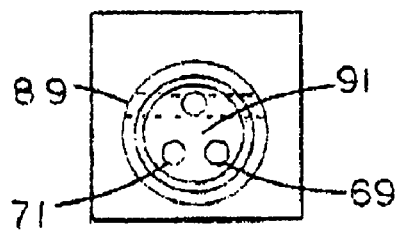
FIG. 3A is a cross sectional view along line 3A-3A showing the concentrate conduit as one channel and the water conduit as two channels.
Figure 4:
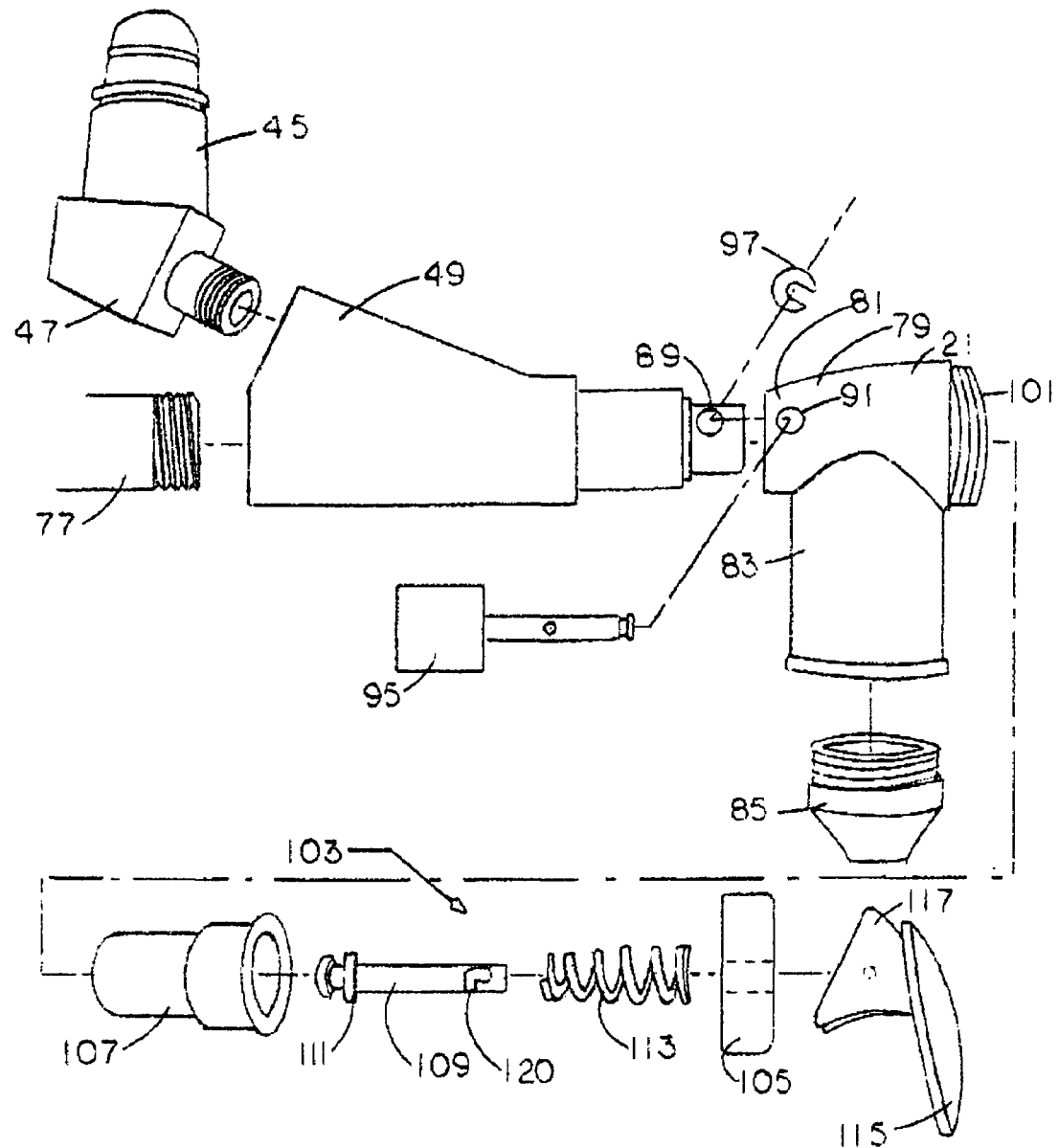
FIG. 4 is an exploded side elevation showing the flow of both water and concentrate from their respective sources, the mixing chamber and the dispenser.
Figure 5:
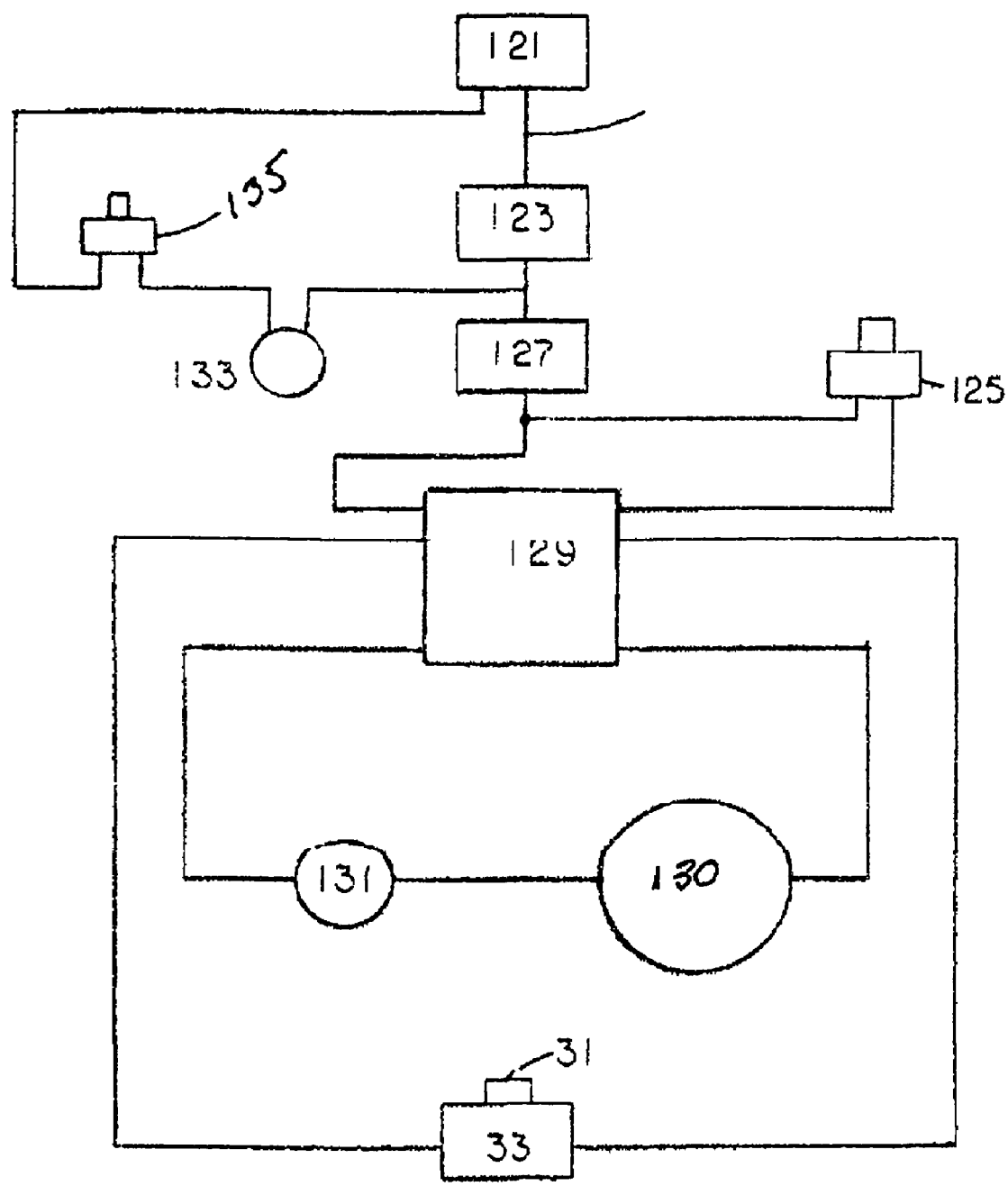
FIG. 5 is a schematic diagram of the electrical circuit that controls the operation of the apparatus for producing a beverage from concentrate.

In the lower portion 67 of the conduit housing 49 is the water conduit 69. The water conduit 69 (FIG. 3A) is shown as two channels 11. One, two or three and possibly more channels 71 may be used to form the water conduit 69. The number of channels 71 will depend upon the beverage being produced, the concentration level of the concentrate and the desired level of dilution by water. The water conduit 69, regardless of the number of channels 71, is substantially horizontal.

The supply line 37 provides water to the water tank 25 when an automatic feed is utilized. The fill valve 33 is located in the supply line 31. A float valve 73 is located in one side 35 of the water tank 25 above the fill inlet 34 and above the level of the water outlet 75 from the tank 25.

By means of a nipple 77, threaded at both ends, the water conduit 69 is connected (FIG. 1) to the water tank 25 at the inlet end 61 of the conduit housing 49. The conduit housing 49 is connected to the mixing chamber 79 at the outlet end 63. The mixing chamber 79 includes two sections, namely an upper section 81 which is also a dispenser housing 81 and a lower section 83 which is also a spout 83. A nozzle 85 is connected to the lower end of the spout 83 remote from the dispenser housing 81.

The conduit housing 49 at the outlet end 63 has a cylindrical extension 87. A conduit opening 89 extends through the cylindrical extension 87 generally at right angles to the concentrate conduit 51. A mixing opening 91 extends through the upper section 81 of the mixing chamber 79. The upper section 81 of the mixing chamber 79, also being cylindrical, slides over the cylindrical extension 87 with the upper section 81 of the mixing chamber 79 mounted on the cylindrical extension 87, the mixing opening 91 and the conduit opening 89 become aligned with one another. A strength valve 93 (FIG. 2A) is placed into the conduit opening 89 and the mixing opening 91. The strength valve 93 which is a cylindrical rod with a knob 95 at one end, secures the mixing chamber 91 to the cylindrical extension 87. A retaining ring 97 on the end of the strength valve 93 retains the strength valve 93 in place.

A passageway 99 through the strength valve 93 which is located generally at right angles to the strength valve 93 aligns with the concentrate conduit 51. By turning the knob 95, the passageway 99 is misaligned to a degree consistent with the degree that the knob 95 is turned in relationship to the concentrate conduit 51. In this way, the rate of flow of the concentrate can be modified consistent with the strength of the beverage desired.

The upper section 81 of the mixing chamber 79 which is also the dispenser housing and the spout 83 are both hollow cylinders and are located generally at right angles to one another. As previously stated, the upper section 81 or dispenser housing 81 is open at both ends and one end is placed over the cylindrical extension 87. On the other end, an external thread 101 is located on which a dispenser assembly 103 is mounted by means of a cap 105. The dispenser assembly 103 includes a stopper 107 which is placed against the outlet end 63 of the conduit housing 49 blocking both the water conduit 69 and the concentrate conduit 51. An actuator rod 109 engages the stopper 107. The actuator rod 109 has a ring 111 about it which is located toward the stopper 107. A coil spring 113 is mounted about the actuator rod 109 and is compressed between the ring 111 and the cap 105 whereby the coil spring 113 forces the stopper 107 against the outlet end 63 of the conduit housing 49 to block both the water conduit 69 and the concentrate conduit 51. The dispenser assembly includes a handle 115 and on the back of the handle 115 there are a pair of rocker members 117. The actuator rod 109 extends through the cap 105 and is connected to the handle 115 between the pair of rocker members 117. A pin 119 in the rocker members 117 secures the actuator rod 109 to the rocker members. The pin 119 in the rocker members 117 slides into a groove and opening 120 to secure the actuator rod 109 to the rocker member 117. By pressing on the bottom of the handle 115, the actuator rod 109 is pulled back which also pulls back the stopper 107 thereby releasing both the concentrate and the water from the concentrate conduit 51 and the water conduit 69 respectively.

It should be specifically noted the stopper 107 prevents flow directly adjacent the strength valve 93 and the mixing chamber 79. The mixture of water and concentrate then directly leaves the mixing chamber 79 for consumption. If the stopper 107 were located after the mixing chamber 79, a previous mixture would be included in a subsequent withdrawal.

The mixing chamber 79 causes the concentrate and water to mix by swirling within the mixing chamber 79. The mixing chamber 79 performs both blending and mixing. The spout 83, which is part of the mixing chamber 79 continues the mixing and blending. The final product is delivered from the bottom of the nozzle 85 attached to the bottom of the spout 83.

A power source 121 of one-hundred ten volt alternating current is required. Power is supplied from the power source 121 through a switch 123, which is preferably a rocker switch. With the switch 123 turned on a red light 125 is turned on. The red light 125 is the low water fill light. Power also flows to a float switch 127 which is normally closed and which activates a relay 129 which opens the fill valve 33 which begins water from the fill line 31 to increase the water level in the water tank 25. Once the desired water level is achieved, the float switch 127 is raised to a desired level which in turn opens the float switch 127 and closes the fill valve 33. Once the fill valve 33 is turned off a thermal adjusting unit 130 is activated to bring the temperature of the water to a desired level. When the desired temperature of the water is achieved, the normally closed thermo button 131 is opened which de-energizes the thermal adjusting unit 130 and also closes a normally open thermal button 133 which turns on a green light 135. The lighting of the green light 135 indicates that the apparatus is ready for use. The thermal adjusting unit 130 is shown as a heating element but a cooling element is also within the scope of a thermal adjusting unit 130.

In operation, the switch 123 is closed. As shown in FIG. 1, the water tank 25 fills from the supply line 31 through the fill valve 33. The concentrate flows by gravity from the concentrate container 39. The water in the water tank 25 flows from the water tank 25 by gravity. The thermal control button 131 holds the water temperature at approximately One hundred ninety degrees Fahrenheit. Once the water level drops, the float switch 127 opens the fill valve 33 to supply additional water. By pulling or pushing the handle 115, a receptacle (not shown) is filled through the nozzle 85 with a mixture of concentrate and water in whatever quantity is desired.

The advantages of the apparatus described are many. By use of gravity feed for both the water and the concentrate, pumps, both manual and powered, are eliminated. The cost of the apparatus is brought down to a reasonable level for home and office usage and the size of the apparatus is also suitable for home and office use. The mixing chamber 79 provides excellent blending and mixing resulting in a very desirable drink. When used with liquid coffee concentrate, a exceptional coffee drink is produced.

It is to be understood that the drawings and descriptive matter are in all cases to be interpreted as merely illustrative of the principles of the invention, rather than as limiting the same in any way, since it is contemplated that there are various elements to achieve like results without departing from the spirit of the invention or the scope of the appended claims.

The invention claimed is:

1. An apparatus for producing a beverage from concentrate comprising:
   a mixing chamber;
   a water tank;
   a concentrate container;
   a water conduit horizontally oriented and connected to the water tank to supply water from the water tank to the mixing chamber by gravity;
   a concentrate conduit extending from the concentrate container and extending at an acute angle to the water conduit and then generally parallel to the water conduit and in close proximity to the water conduit, the mixing chamber being connected to both the water conduit and the concentrate conduit, both the concentrate conduit and the water conduit having an outlet end, each outlet end being remote from the water tank and the concentrate container, the outlet end of the concentrate conduit being adjacent to the outlet end of the water conduit;
   a dispenser assembly mounted on the mixing chamber, the dispenser assembly comprising a stopper which presses against the water conduit and the concentrate conduit; and
   an electrical circuit including a means for adjusting the temperature of the water.

2. An apparatus according to claim 1 wherein the mixing chamber has a dispenser housing and a spout, both the dispenser housing and the spout being hollow cylinders and being generally located at right angles to one another.

3. An apparatus according to claim 1 wherein the water tank has a filler port for supplying water to the tank.

4. An apparatus according to claim 1 including a strength valve for adjusting the flow of concentrate in the concentrate conduit.

5. An apparatus according to claim 1 wherein the water tank has a vent.

6. An apparatus according to claim 1 wherein the concentrate container is a flexible bag.

7. An apparatus according to claim 1 wherein the outlet end of the concentrate conduit being above and adjacent to the outlet end of the water conduit.

8. An apparatus according to claim 2 wherein the water tank has a filler port for supplying water to the tank.

9. An apparatus according to claim 2 including a strength valve for adjusting the flow of concentrate in the concentrate conduit.

10. An apparatus according to claim 2 wherein the water tank has a vent.

11. An apparatus according to claim 2 wherein the concentrate container is a flexible bag.

12. An apparatus according to claim 2 wherein the outlet end of the concentrate conduit being above and adjacent to the outlet end of the water conduit.

* * * * *